(12) United States Patent
Yang et al.

(10) Patent No.: US 12,196,965 B2
(45) Date of Patent: Jan. 14, 2025

(54) DISPLAY DEVICE, AUGMENTED REALITY APPARATUS AND DISPLAY METHOD

(71) Applicant: BOE Technology Group Co., Ltd., Beijing (CN)

(72) Inventors: Junxing Yang, Beijing (CN); Jinye Zhu, Beijing (CN); Sen Ma, Beijing (CN); Jing Yu, Beijing (CN); Tianyang Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 554 days.

(21) Appl. No.: 17/524,643

(22) Filed: Nov. 11, 2021

(65) Prior Publication Data
US 2022/0229223 A1 Jul. 21, 2022

(30) Foreign Application Priority Data
Jan. 18, 2021 (CN) .......................... 202110062387.3

(51) Int. Cl.
*G02B 27/01* (2006.01)
*G02B 6/34* (2006.01)
(Continued)

(52) U.S. Cl.
CPC ........... *G02B 27/0172* (2013.01); *G02B 6/34* (2013.01); *G02B 27/126* (2013.01);
(Continued)

(58) Field of Classification Search
CPC .. G02B 27/01; G02B 27/017; G02B 27/0101; G02B 27/0172; G02B 27/0176;
(Continued)

(56) References Cited

U.S. PATENT DOCUMENTS

2016/0234485 A1* 8/2016 Robbins ............... H04N 13/332
2020/0158944 A1* 5/2020 Wang ................. G02B 27/0172
(Continued)

FOREIGN PATENT DOCUMENTS

| CN | 107277496 A | 10/2017 |
|---|---|---|
| CN | 108205198 A | 6/2018 |

(Continued)

OTHER PUBLICATIONS

CN 202110062387.3 first office action dated Apr. 26, 2024.

*Primary Examiner* — Sultan Chowdhury
(74) *Attorney, Agent, or Firm* — IPro, PLLC

(57) ABSTRACT

A display device includes: a first coupling-in module configured to couple first image light into a light guide assembly at a preset first incident angle, thereby enabling the first image light to propagate in the light guide assembly by total reflection and to be incident in a coupling-out light-splitting module; a second coupling-in module configured to couple second image light into the light guide assembly at a preset second incident angle, thereby enabling the second image light to propagate in the light guide assembly and to be incident in the coupling-out light-splitting module; a coupling-out light-splitting module configured to, couple the first and second image light out from the light guide assembly to enter a first position area and a second position area of the human eye, respectively. The first and second image light are different light field information of an identical image; and are both collimated light.

17 Claims, 6 Drawing Sheets

(51) Int. Cl.
*G02B 27/12* (2006.01)
*H04N 13/341* (2018.01)

(52) U.S. Cl.
CPC ... *H04N 13/341* (2018.05); *G02B 2027/0127* (2013.01); *G02B 2027/0134* (2013.01)

(58) Field of Classification Search
CPC ............ G02B 27/0178; G02B 27/0126; G02B 2027/0127; G02B 2027/0134; G02B 2027/0178; H04N 13/00; H04N 13/332; H04N 13/341; H04N 13/342; H04N 13/344

See application file for complete search history.

(56) References Cited

U.S. PATENT DOCUMENTS

| | | | |
|---|---|---|---|
| 2020/0264367 A1* | 8/2020 | Huang | G02B 27/0081 |
| 2020/0271932 A1* | 8/2020 | Tuomisto | G02B 27/0944 |
| 2020/0292820 A1* | 9/2020 | Lo | G02B 27/0172 |
| 2022/0308343 A1 | 9/2022 | Yang et al. | |

FOREIGN PATENT DOCUMENTS

| | | |
|---|---|---|
| CN | 111158153 A | 5/2020 |
| CN | 111308717 A | 6/2020 |
| CN | 111679361 A | 9/2020 |
| CN | 111679362 A | 9/2020 |
| CN | 112213855 A | 1/2021 |

\* cited by examiner

DISPLAY DEVICE, AUGMENTED REALITY APPARATUS AND DISPLAY METHOD

CROSS-REFERENCE TO RELATED APPLICATIONS

The present application claims a priority to the Chinese patent application No. 202110062387.3 filed in China on Jan. 18, 2021, a disclosure of which is incorporated herein by reference in its entirety.

TECHNICAL FIELD

The present application relates to the field of display technologies, and in particular to a display device, an augmented reality apparatus and a display method.

BACKGROUND

A 3D display device presents a 3D visual effect based on binocular parallax, and its principle is to divide a display screen into two display areas including a left display area and a right display area, enable the two display areas to display a left eye image and a right eye image with a certain parallax, respectively, so that when the two images with the certain parallax are received by left and right eyes of a person, they are merged by the brain of the person to produce a 3D visual effect. However, in the process of human eyes viewing such display device, a depth of accommodation generated by adjustment of crystalline lens is always fixed on the display screen, and a depth of vergence generated by eye movements will vary with a spatial position of a 3D object, which leads to inconsistency between the depth of accommodation and the depth of vergence. That is, images of different depths of field seen by the human eyes are converged on the display screen, but there are actually depths of field, thus the problem of a vergence-accommodation conflict occurs, which in turn leads to discomfort such as dizziness in viewers.

In view of the problem of vergence-accommodation conflict, the integral imaging 3D display technology based on micro-lens array is proposed, but a resolution of displayed 3D images is low, which is difficult to meet visual needs of the human eyes. The multi-focal near-eye 3D display technology is also proposed and uses multiple layers of screens to achieve different focal planes, but it has disadvantage of relatively large volume.

SUMMARY

In a first aspect, one embodiment of the present disclosure provides a display device, including: a first projection assembly; a first coupling-in module corresponding to the first projection assembly; a second projection assembly; a second coupling-in module corresponding to the second projection assembly; a light guide assembly; and a coupling-out light-splitting module. The first coupling-in module is configured to couple first image light projected by the first projection assembly into the light guide assembly at a preset first incident angle, thereby enabling the first image light to propagate in the light guide assembly by total reflection according to a preset first total reflection angle and enabling the first image light to be incident in the coupling-out light-splitting module. The second coupling-in module is configured to couple second image light projected by the second projection assembly into the light guide assembly at a preset second incident angle, thereby enabling the second image light to propagate in the light guide assembly by total reflection according to a preset second total reflection angle and enabling the second image light to be incident in the coupling-out light-splitting module. The coupling-out light-splitting module is configured to, couple the first image light propagated in the light guide assembly by total reflection out from the light guide assembly at a first deflection angle to enter a first position area of the human eye and couple the second image light propagated in the light guide assembly by total reflection out from the light guide assembly at a second deflection angle to enter a second position area of the human eye. The first image light and the second image light are different light field information of an identical image; and the first image light and the second image light are both collimated light.

In some optional embodiments, the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a diffraction grating element. The first coupling-in module and the second coupling-in module are disposed at two sides of the light guide assembly relative to the coupling-out light-splitting module, respectively. The first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module. The display device is configured as: in a first time slot of one time period, projecting, by the first projection assembly, the first image light to the first coupling-in module; coupling, by the first coupling-in module, the first image light into the light guide assembly; in response to a loaded electric field, modulating, by each coupling-out light-splitting sub-module in the coupling-out light-splitting module, the first image light emitted by the corresponding sub-pixel, and emitting the modulated first image light to a first position area in the human eye; in a second time slot of the one time period, projecting, by the second projection assembly, the second image light to the second coupling-in module; coupling, by the second coupling-in module, the second image light into the light guide assembly; in response to a loaded electric field, modulating, by each coupling-out light-splitting sub-module in the coupling-out light-splitting module, the second image light emitted by the corresponding sub-pixel, and emitting the modulated second image light to a second position area in the human eye. An interval between the first time slot and the second time slot is less than human visual residual time.

In some optional embodiments, each of the first coupling-in module and the second coupling-in module is a diffraction grating element which is arranged at one side of the light guide assembly close to the human eye.

In some optional embodiments, the diffraction grating element is one of a surface relief grating, a holographic Bragg grating, and a controllable nano-grating.

In some optional embodiments, each of the first coupling-in module and the second coupling-in module is a planar reflective element, and the planar reflective elements are disposed at two sides of the light guide assembly at a preset inclination angle.

In some optional embodiments, the planar reflective element is a wedge-shaped reflective surface coated with a film.

In some optional embodiments, the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a micro-reflective element. The first coupling-in module and the second coupling-in module are reflective grating elements disposed at one side of the light guide assembly away from the human eye; and the first coupling-in module and the second coupling-in module are respectively disposed at two sides of the light guide assembly relative to the coupling-out light-splitting module. The first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module. The display device is configured as: in one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by each coupling-out light-splitting sub-module in the coupling-out light-splitting module, the first image light emitted by the corresponding sub-pixel in the first projection assembly, and emitting the modulated first image light to a first position area in the human eye; and modulating, by each coupling-out light-splitting sub-module in the coupling-out light-splitting module, the second image light emitted by the corresponding sub-pixel in the second projection assembly, and emitting the modulated second image light to a second position area in the human eye.

In some optional embodiments, the coupling-out light-splitting sub-module is a micro-triangular prism; the micro-triangular prism includes a bottom side, a first lateral side, and a lateral second side; a size of the bottom side is corresponding to a size of the sub-pixel; the first lateral side is configured to, emit the first image light, which is projected by the sub-pixel corresponding to the first lateral side in the first projection assembly and which is incident on the first lateral side, to the first position area in the human eye; the second lateral side is configured to, emit the second image light, which is projected by the sub-pixel corresponding to the second lateral side in the second projection assembly and which is incident on the second lateral side, to the second position area in the human eye. An angle defined between a normal line perpendicular to the light guide assembly and the first lateral side of each of coupling-out light-splitting sub-modules in the coupling-out light-splitting module, is decreased sequentially along a first direction. An angle defined between the normal line perpendicular to the light guide assembly and the second lateral side of each of coupling-out light-splitting sub-modules in the coupling-out light-splitting module, is increased sequentially along the first direction.

In some optional embodiments, the coupling-out light-splitting module further includes a first deflection auxiliary portion covering each of the coupling-out light-splitting sub-modules; and a first refractive index of the first deflection auxiliary portion is less than a refractive index of the coupling-out light-splitting sub-module.

In some optional embodiments, the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module includes a light-splitting portion and a second deflection auxiliary portion covering the light-splitting portion; the light-splitting portion is a micro-reflective element; the second deflection auxiliary portion is a liquid crystal layer; in response to a voltage applied to the liquid crystal layer, liquid crystal modules in the liquid crystal layer are deflected to enable the liquid crystal layer to have a variable second refractive index; the second refractive index is less than a refractive index of the light-splitting portion. Each of the first coupling-in module and the second coupling-in module is a reflective grating element; the first coupling-in module and the second coupling-in module are disposed at one side of the light guide assembly away from the human eye; the first coupling-in module and the second coupling-in module are respectively disposed at two sides of the light guide assembly relative to the coupling-out light-splitting module. The first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module. The display device is configured as: in a first time slot of one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a first position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a second position area in the human eye; in a second time slot of the one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a third position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a fourth position area in the human eye. An interval between the first time slot and the second time slot is less than the human visual residual time; the first image light and the second image light in the first time slot, and the first image light and the second image light in the second time slot are different light field information of the same image.

In some optional embodiments, each of the first projection assembly and the second projection assembly includes a collimated backlight source and a display panel; the collimated backlight source is configured to emit collimated backlight to the display panel; the collimated backlight source is a laser light source; the display panel is configured to control a color and gray scale of light emitted from each pixel, and emit collimated image light according to the incident collimated backlight; the display panel is an LCD, LCOS or Micro-OLED; and/or, the light guide assembly is a transparent glass substrate.

In a second aspect, one embodiment of the present application provides an augmented reality apparatus, including foregoing display device.

In a third aspect, one embodiment of the present application provides a display method for the foregoing display device, including: using the first coupling-in module to couple first image light projected by the first projection assembly into the light guide assembly at a preset first incident angle, thereby enabling the first image light to propagate in the light guide assembly by total reflection according to a preset first total reflection angle and then enabling the first image light to be incident in the coupling-out light-splitting module; using the second coupling-in module to couple second image light projected by the second projection assembly into the light guide assembly at a preset second incident angle, thereby enabling the second image light to propagate in the light guide assembly by total reflection according to a preset second total reflection angle and then enabling the second image light to be incident in the coupling-out light-splitting module; using the coupling-out light-splitting module to couple the first image light propagated in the light guide assembly by total reflection out from the light guide assembly at a first deflection angle to enter a first position area of the human eye; using the coupling-out light-splitting module to couple the second image light propagated in the light guide assembly by total reflection out from the light guide assembly at a second deflection angle to enter a second position area of the human eye. The first image light and the second image light are different light field information of an identical image; and the first image light and the second image light are both collimated light.

In some optional embodiments, the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a diffraction grating element; the first coupling-in module and the second coupling-in module are disposed at two sides of the light guide assembly relative to the coupling-out light-splitting module, respectively; the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module. The display method further includes: in a first time slot of one time period, projecting, by the first projection assembly, the first image light to the first coupling-in module; coupling, by the first coupling-in module, the first image light into the light guide assembly; in response to a loaded electric field, modulating, by each coupling-out light-splitting sub-module in the coupling-out light-splitting module, the first image light emitted by the corresponding sub-pixel, and emitting the modulated first image light to a first position area in the human eye; in a second time slot of the one time period, projecting, by the second projection assembly, the second image light to the second coupling-in module; coupling, by the second coupling-in module, the second image light into the light guide assembly; in response to a loaded electric field, modulating, by each coupling-out light-splitting sub-module in the coupling-out light-splitting module, the second image light emitted by the corresponding sub-pixel, and emitting the modulated second image light to a second position area in the human eye. An interval between the first time slot and the second time slot is less than human visual residual time.

In some optional embodiments, the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a micro-reflective element; the first coupling-in module and the second coupling-in module are reflective grating elements disposed at one side of the light guide assembly away from the human eye; and the first coupling-in module and the second coupling-in module are respectively disposed at two sides of the light guide assembly relative to the coupling-out light-splitting module; the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module. The display method includes: in one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by each coupling-out light-splitting sub-module in the coupling-out light-splitting module, the first image light emitted by the corresponding sub-pixel in the first projection assembly, and emitting the modulated first image light to a first position area in the human eye; and modulating, by each coupling-out light-splitting sub-module in the coupling-out light-splitting module, the second image light emitted by the corresponding sub-pixel in the second projection assembly, and emitting the modulated second image light to a second position area in the human eye.

In some optional embodiments, the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module includes a light-splitting portion and a second deflection auxiliary portion covering the light-splitting portion; the light-splitting portion is a micro-reflective element; the second deflection auxiliary portion is a liquid crystal layer; in response to a voltage applied to the liquid crystal layer, liquid crystal modules in the liquid crystal layer are deflected to enable the liquid crystal layer to have a variable second refractive index; the second refractive index is less than a refractive index of the light-splitting portion; each of the first coupling-in module and the second coupling-in module is a reflective grating element; the first coupling-in module and the second coupling-in module are disposed at one side of the light guide assembly away from the human eye; the first coupling-in module and the second coupling-in module are respectively disposed at two sides of the light guide assembly relative to the coupling-out light-splitting module; the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module. The display method includes: in a first time slot of one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a first position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a second position area in the human eye; in a second time slot of the one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a third position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a fourth position area in the human eye. An interval between the first time slot and the second time slot is less than the human visual residual time; the first image light and the second image light in the first time slot, and the first image light and the second image light in the second time slot are different light field information of the same image.

Additional aspects and advantages of the present application will be given in the following description, which will become apparent from the following description, or be understood through practice of the present application.

BRIEF DESCRIPTION OF THE DRAWINGS

The foregoing and/or additional aspects and advantages of the present application will become apparent and easy to understand from the following description of the embodiments in conjunction with the accompanying drawings, in which.

DETAILED DESCRIPTION

Figure 1:
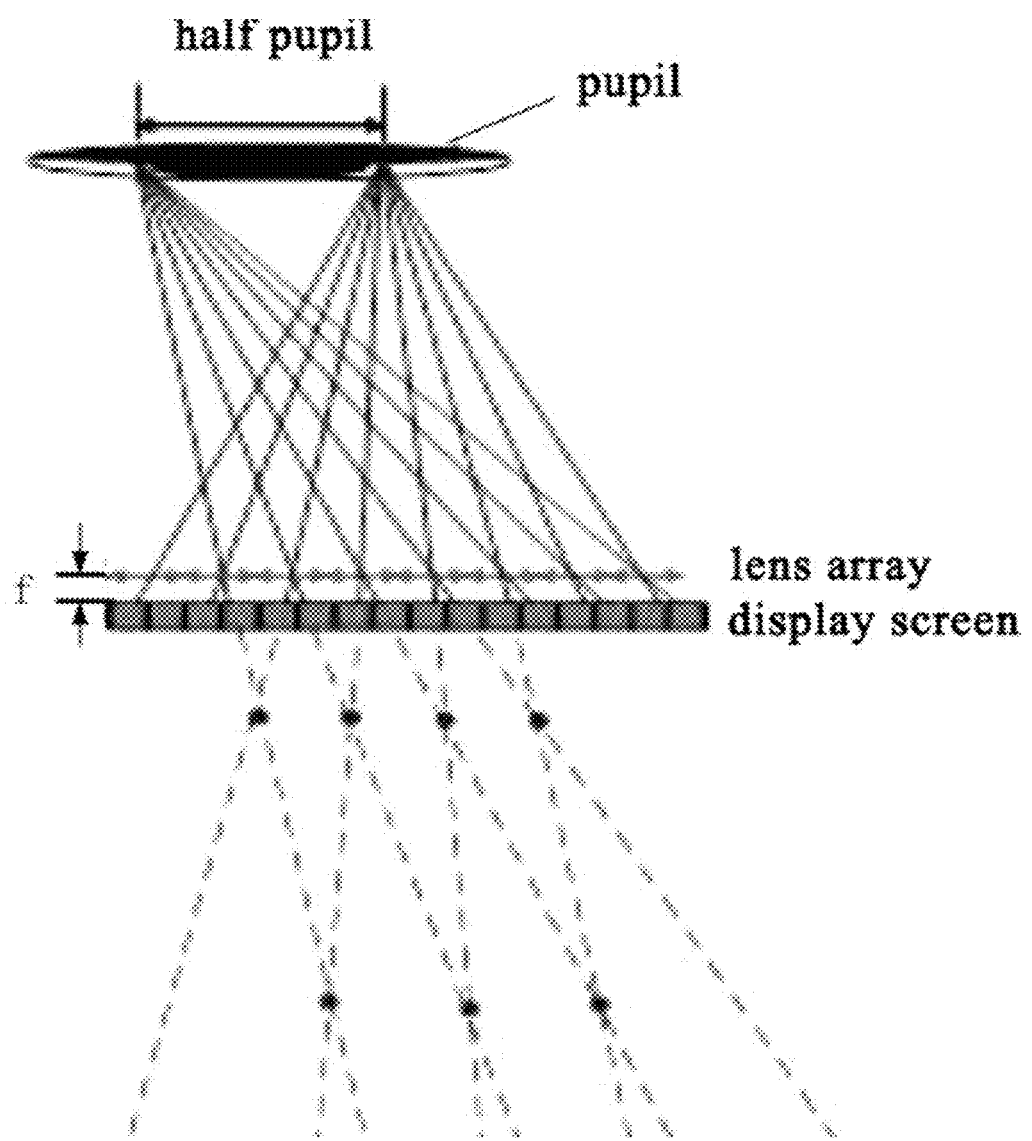
FIG. 1 shows a schematic display scheme for realizing real light field display in the related art.

The present disclosure is described in detail below. Examples of embodiments of the present disclosure are shown in the drawings, where the same or similar reference numerals indicate the same or similar components or components having the same or similar functions. Further, if detailed descriptions of known technologies are unnecessary for the illustrated features of the present disclosure, they are omitted. The embodiments described below with reference to the drawings are exemplary, and only used to explain the present disclosure, and cannot be construed as limiting the present disclosure.

Referring to FIG. 1, it shows a light field display scheme of a micro-lens array. As shown in FIG. 1, a display screen is located at a focal plane of the lens array and each sub-pixel emits collimated light rays in a single direction. Multiple beams of single-direction light rays, which enter the pupil, have an intersection point in space, which an image point of the light field imaging. An image point formed by beams of light rays from adjacent lenses is at a position near the display screen, and an image point formed by beams of light rays from non-adjacent lenses is at a position away from the display screen. Although FIG. 1 does not show many beams of light rays, but in fact, when beams of light rays are dense, a number of different planes of image points are formed in front of the display screen. The different planes formed by image points are also different depth-of-field surfaces, and the human eyes can focus on any different depth-of-field surfaces when viewing, thereby realizing light field 3D display with different depths of field.

However, the biggest disadvantage of the light field display scheme of the micro-lens array is insufficient display resolution. Pixels in the same display screen are allocated to different N viewpoints, which causes a resolution to drop to 1/N (N≥2) of an original resolution of the display screen, i.e., reducing the original resolution of the display screen by at least half.

Figure 2:
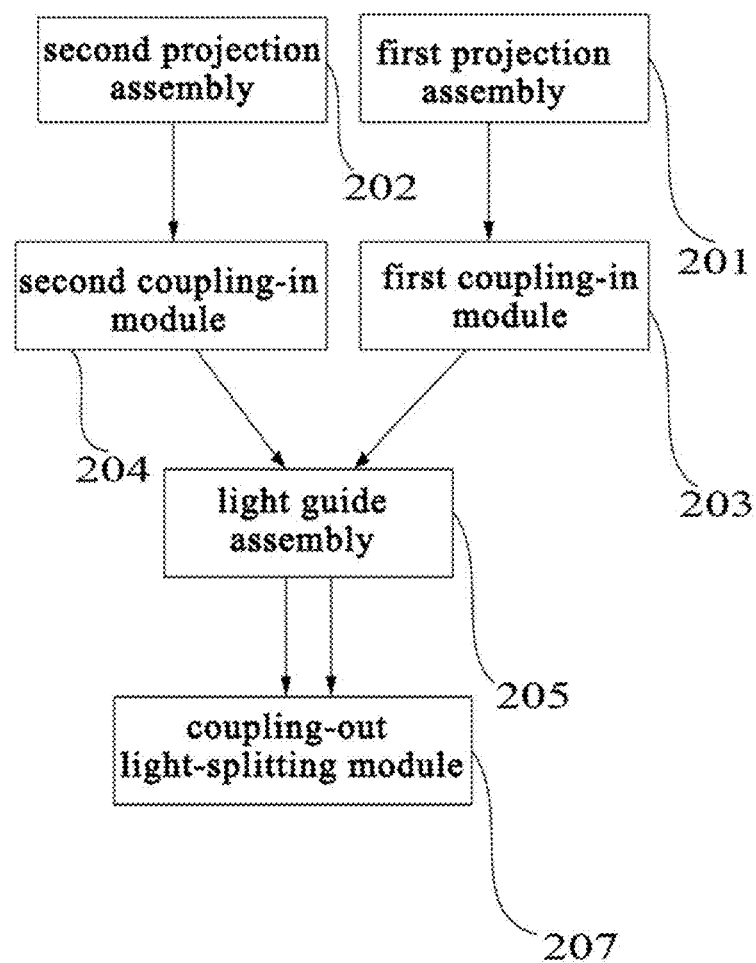
FIG. 2 is a schematic block diagram of a display device according to an embodiment of the present application.

In view of the foregoing problems, as shown in FIG. 2, one embodiment of the present application provides a display device, including: a first projection assembly, a first coupling-in module corresponding to the first projection assembly, a second projection assembly, a second coupling-in module corresponding to the second projection assembly, a light guide assembly and a coupling-out light-splitting module.

The first coupling-in module is configured to couple first image light projected by the first projection assembly into the light guide assembly at a preset first incident angle, thereby enabling the first image light to propagate in the light guide assembly by total reflection according to a preset first total reflection angle and then enabling the first image light to be incident in the coupling-out light-splitting module.

The second coupling-in module is configured to couple second image light projected by the second projection assembly into the light guide assembly at a preset second incident angle, thereby enabling the second image light to propagate in the light guide assembly by total reflection according to a preset second total reflection angle and then enabling the second image light to be incident in the coupling-out light-splitting module.

The coupling-out light-splitting module is configured to, couple the first image light propagated in the light guide assembly by total reflection out from the light guide assembly at a first deflection angle to enter a first position area of the human eye and couple the second image light propagated in the light guide assembly by total reflection out from the light guide assembly at a second deflection angle to enter a second position area of the human eye.

The first image light and the second image light are different light field information of an identical image. The first image light and the second image light are both collimated light.

In this embodiment, the first image light projected by the first projection assembly and the second image light projected by the second projection assembly are coupled into the light guide assembly at preset angles through the first coupling-in module and the second coupling-in module, respectively. Then, the first image light and the second image light are transmitted in a total reflection manner in the light guide assembly. And then, the coupling-out light-splitting module couples the first image light and the second image light out from the light guide assembly to enter the first position area and the second position area of the human eye, respectively. In this way, vergence-accommodation conflict can be avoided in the near-eye light field display; meanwhile, a resolution of the near-eye light field display can be improved while reducing sizes of the display device, which has a wide range of application prospects.

In an example, as shown in FIG. 2, the display device includes a first projection assembly 201, a first coupling-in module 203, a second projection assembly 202, a second coupling-in module 204, a light guide assembly 205 and a coupling-out light-splitting module 207. The first projection assembly 201 projects first image light to the first coupling-in module 203. The second projection assembly 202 projects second image light to the second coupling-in module 204. The first image light and the second image light are different light field information of an identical image and are all collimated light. Optionally, each of the first projection assembly 201 and the second projection assembly 202 includes a collimated backlight source and a display panel. The collimated backlight source is configured to emit collimated backlight to the display panel. The collimated backlight source may be a laser light source. The display panel is configured to control a color and gray scale of emitted light of each pixel, and emit collimated image light according to the incident collimated backlight. The display panel may be LCD, LCOS or Micro-OLED.

The first coupling-in module 203 couples the first image light projected to the first coupling-in module 203 into the light guide assembly 205 at a preset first incident angle, thereby enabling the first image light to be transmitted in a total reflection manner within the light guide assembly 205 according to a preset first total reflection angle, so as to control the first image light to be incident in the coupling-out light-splitting module 207. On the other hand, the second coupling-in module 204 couples the second image light projected to the second coupling-in module 204 into the light guide assembly 205 at a preset second incident angle, thereby enabling the second image light to be transmitted in a total reflection manner within the light guide assembly 205 according to a preset second total reflection angle, so as to control the second image light to be incident in the coupling-out light-splitting module 207. The light guide assembly 205 is configured to transmit image light in a total reflection manner. In this embodiment, the light guide assembly 205 is a common transparent glass substrate with high transparency, and a refractive index of the light guide assembly is not specifically limited.

It is worth noting that, in the following, different examples of the same module or assembly will be represented with different similar symbols. For instance, for different examples of the first coupling-in module and the second coupling-in module, the first coupling-in module may be represented with numerals 202-1, 202-2 and 202-3, respectively; the second coupling-in module may be represented with numerals 204-1, 204-2 and 204-3, respectively; and the coupling-out light-splitting module may be represented with numerals 207-1 and 207-2, respectively. However, when there is no need to distinguish, the first coupling-in module is represented with the numeral 202, the second coupling-in module is represented with the numeral 204, and the coupling-out light-splitting module is represented with the numeral 207.

Figure 3:
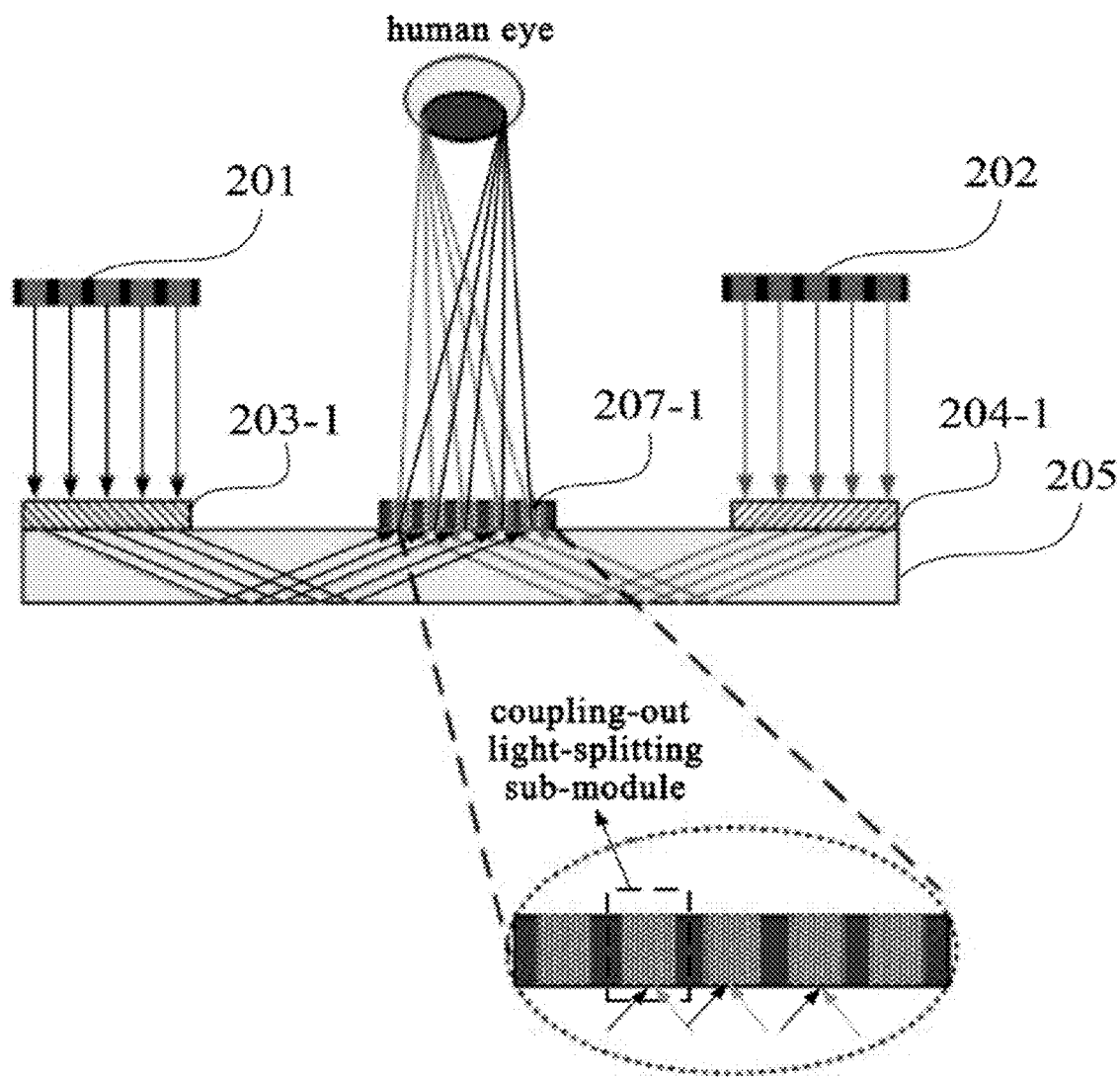
FIG. 3 is a schematic cross-sectional view of a display device according to an embodiment of the present application.

Referring also to FIG. 3, the first image light (which is represented by dark solid lines in FIG. 3, and which is image light coupled into the light guide assembly 205 from the first coupling-in module 203-1), which is totally reflected and transmitted in the light guide assembly 205, is incident into the coupling-out light-splitting module 207-1. Then, the coupling-out light-splitting module 207-1 couples the incident first image light out from the light guide assembly 205 at a preset first deflection angle to enter a first position area of the human eye. The second image light (which is represented by light solid lines in FIG. 3, and which is image light coupled into the light guide assembly 205 from the second coupling-in module 204-1), which is totally reflected and transmitted in the light guide assembly 205, is incident into the coupling-out light-splitting module 207-1. Then, the coupling-out light-splitting module 207-1 couples the incident second image light out from the light guide assembly 205 at a preset second deflection angle to enter a second position area of the human eye. The present application does not limit specific values of the first deflection angle and the second deflection angle, as long as it is ensured that a distance between viewpoints, which are formed when the first image light and the second image light emitted from the coupling-out light-splitting module 207-1 enter the first position area and the second position area of the human eye, is less than half of a size of the pupil, thereby ensuring that the human eye can distinguish different viewpoints and presenting a clear image.

In some optional embodiments, as shown in FIG. 3, each of the first coupling-in module 203-1 and the second coupling-in module 204-1 is a diffraction grating element, which is arranged at one side of the light guide assembly 205 close to the human eye. The diffraction grating element may be one of a surface relief grating, a holographic Bragg grating, and a controllable nano-grating. The controllable nano-grating may be, for example, a liquid crystal grating or a HPDLC grating.

Figure 4:
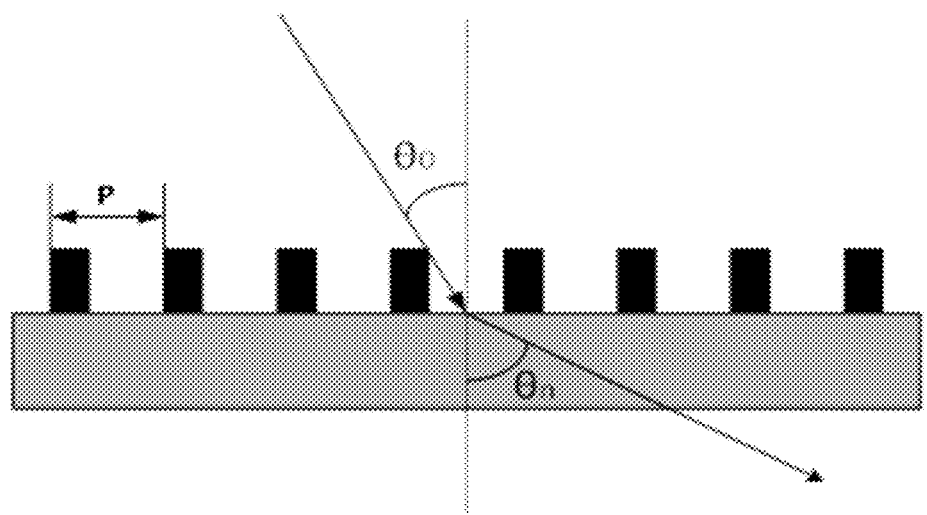
FIG. 4 is a schematic diagram showing the principle of grating diffraction.
Figure 5:
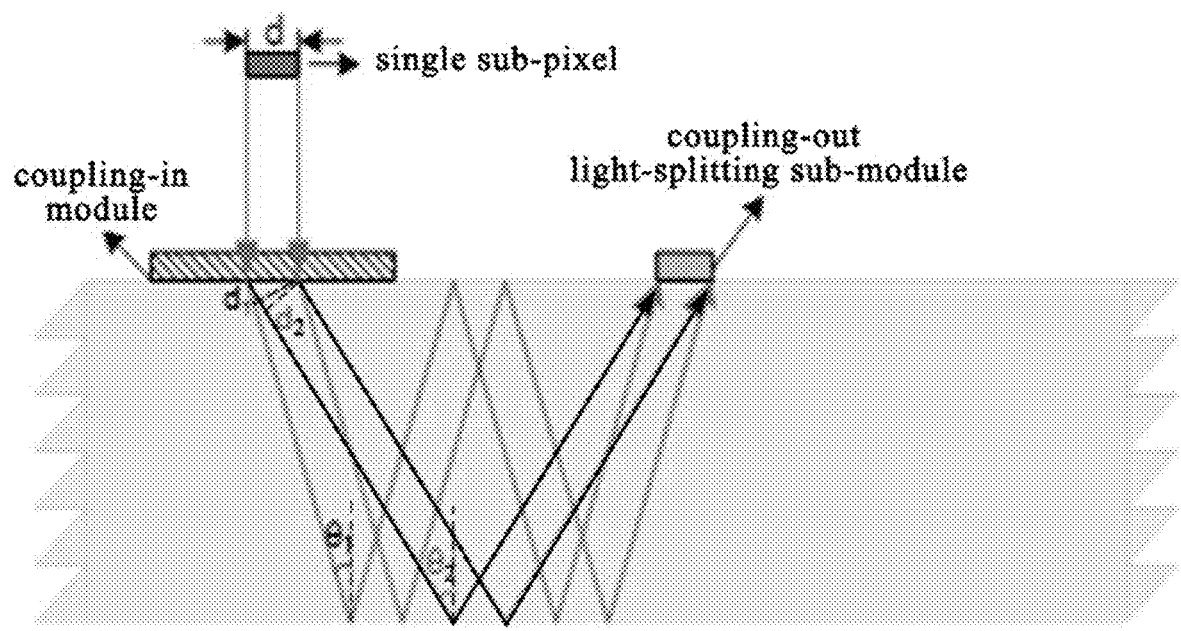
FIG. 5 is a schematic diagram showing diffraction principle of a coupling-in module according to an embodiment of the present application.

Referring to FIG. 4 and FIG. 5, when the coupling-in module is a diffraction grating element, the coupling-in principle of the coupling-in module to the image light is introduced. As shown in FIG. 4, for the diffraction grating element, light entering the grating element at an incident angle $\theta_0$, is diffracted by the grating element and then exits at a diffraction angle (or a deflection angle) $\theta_n$, and the incident angle $\theta_0$ and the diffraction angle $\theta_n$ meet the following grating equation:

$$\sin\theta_0 - \sin\theta_n = m\lambda/p \; (m=0, \pm 1, \pm 2, \ldots) \quad (1)$$

where $\lambda$ represents a wavelength of an incident light, "p" represents a grating cycle, and "m" represents a diffraction order. A first-order diffraction order is usually selected to obtain highest energy. A width of a diffracted beam of light is $d=\cos\theta$.

As shown in FIG. 5, FIG. 5 shows differences between light beams that are coupled into the light guide assembly and then incident into a coupling-out light-splitting submodule, when the diffraction angles are different. Those skilled in the art should understand that this is only to illustrate influence of diffraction angles on the coupled-in light beams, and is not intended to limit the same coupling-in module to have two diffraction angles simultaneously. If a diffraction angle (or a deflection angle) after diffraction modulation $\theta_2 > \theta_1$, according to the grating equation (1), it can be known that d1>d2, that is, the larger the diffraction angle (or deflection angle) of the diffracted light beam, the smaller the width of the light beam, and then the smaller the light spot converges at the human eye, which is more conducive to single-eye multi-viewpoint light field imaging. Therefore, by appropriately setting the grating cycle of the diffraction grating element used as the coupling-in module, the width of the light beam can be reduced, and then the size of the light spot converged at the human eye can be reduced. However, those skilled in the art should understand that the selection of the diffraction angle needs to enable light beams to propagate through total reflection in the light guide assembly, and enable a distance between two viewpoints, which are formed when the first image light and the second image light emitted from the coupling-out light-splitting module 207 enter the first position area and the second position area of the human eye, to be less than half of a size of the pupil.

With the above settings, by employing diffraction grating elements as the first coupling-in module 203 and the second coupling-in module 204, due to the diffraction modulation function of the diffraction grating elements, the first image light and the second image light are diffractively modulated to be deflected, so that the first image light and the second image light are incident into the light guide assembly 205 at the preset first incident angle and the preset second incident angle, respectively. The first incident angle and the second incident angle are diffraction angles. The first image light and the second image light, which are incident into the light guide assembly 205, can be totally reflected and propagated in the light guide assembly 205, then emitted into the coupling-out light-splitting module 207, and then coupled out from the coupling-out light-splitting module 207 into corresponding positions in the human eye. In this way, a spatial light field is formed, that is, image points of the light field imaging are formed, and the human eye can automatically focus on any plane of image points in the spatial light field, thereby realizing near-eye light field display.

Figure 6:
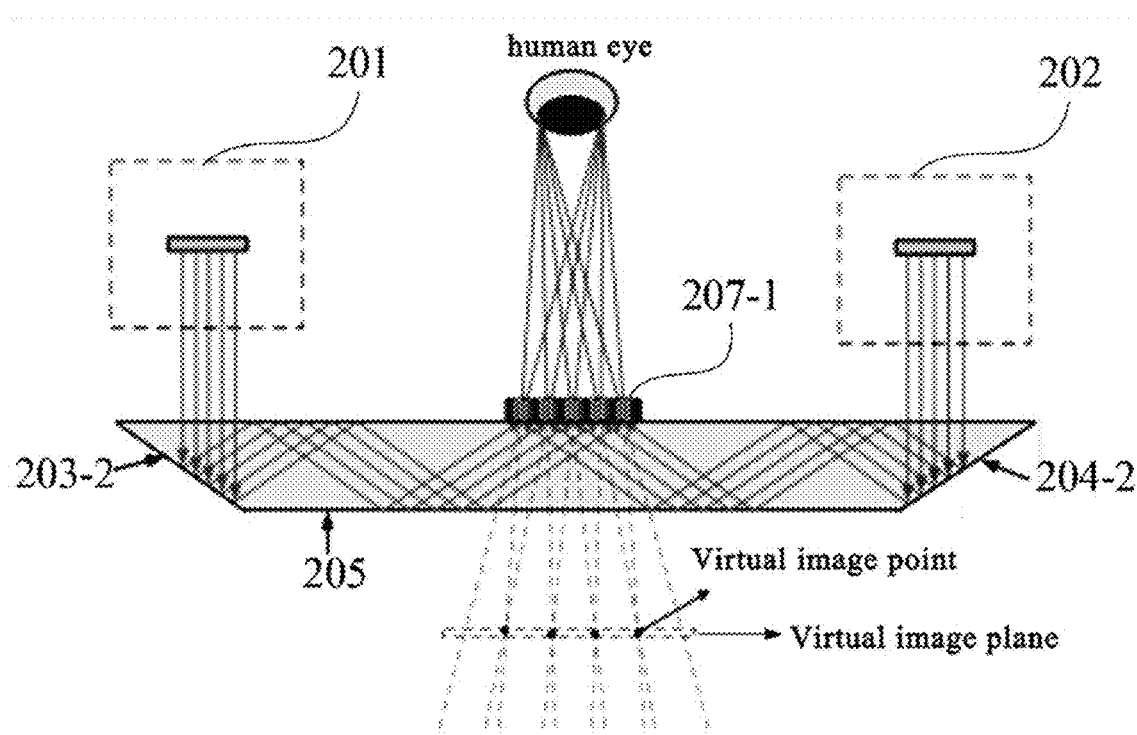
FIG. 6 is a schematic cross-sectional view of a display device according to another embodiment of the present application.

In some optional embodiments, as shown in FIG. 6, each of the first coupling-in module 203-2 and the second coupling-in module 204-2 is a planar reflective element. The planar reflective elements may be disposed at two sides of the light guide assembly 205 at a preset inclination angle. In this embodiment, by reasonably setting the inclination angle of the planar reflective element, the first image light incident on the first coupling-in module 203-2 is incident into the light guide assembly 205 at a preset first incident angle, then is totally reflected and propagated in the light guide assembly 205, and then is emitted into the coupling-out light-splitting module 207-1. The coupling-out light-splitting module 207-1 modulates the first image light emitted by different sub-pixels, so that the first image light coupled out from the coupling-out light-splitting module 207-1 enters the first position area of the human eye. Meanwhile, by reasonably setting the inclination angle of the planar reflective element, the second image light incident on the second coupling-in module 204-2 is incident into the light guide assembly 205 at a preset second incident angle, then is totally reflected and propagated in the light guide assembly 205, and then is emitted into the coupling-out light-splitting module 207-1. The coupling-out light-splitting module 207-1 modulates the second image light emitted by different sub-pixels, so that the second image light coupled out from the coupling-out light-splitting module 207-1 enters the second position area of the human eye. In this way, a spatial light field is formed, that is, image points of the light field imaging are formed, and the human eye can automatically focus on any plane of image points in the spatial light field, thereby realizing near-eye light field display. Specifically, the planar reflective element may be a wedge-shaped reflective surface coated with a film.

Further, referring to FIG. 3, in an optional embodiment, the coupling-out light-splitting module 207-1 is disposed at one side of the light guide assembly 205 close to the human eye. An orthographic projection of the coupling-out light-splitting module 207-1 onto the light guide assembly 205 covers an orthographic projection of the human eye onto the light guide assembly 205. The coupling-out light-splitting module 207-1 includes coupling-out light-splitting sub-modules. The coupling-out light-splitting sub-modules are corresponding to various sub-pixels in the first projection assembly and the second projection assembly in a one-to-one manner, so as to couple out the image light emitted by each sub-pixel in the projection assemblies and emit the coupled out image light into an appropriate area in the human eye. As can be seen from a partial enlarged schematic view of the coupling-out light-splitting module 207-1, the coupling-out light-splitting sub-module is a diffraction grating element. The first coupling-in module 203-1 and the second coupling-in module 204-1 are disposed at two sides of the coupling-out light-splitting module 207-1, respectively. The first projection assembly 201 and the second projection assembly 202 are disposed at one side of the light guide assembly 205 close to the human eye, respectively. A light-emitting side of the first projection assembly 201 is oriented towards the first coupling-in module 203-1. A light-emitting side of the second projection assembly 202 is oriented towards the second coupling-in module 204-1.

When the coupling-out light-splitting sub-module is a diffraction grating element, the coupling-out light-splitting module 207 does not simultaneously couple out the first image light and the second image light. That is, in a time period, the first image light and the second image light are respectively incident into the coupling-out light-splitting module 207-1 in two time slots in a time-division manner, and the coupling-out light-splitting module 207-1 is time-division multiplexed. Those skilled in the art should understand that as long as it is ensured that an interval between a first time slot for projecting the first image light and a second time slot for projecting the second image light is less than a human visual residual time, for humans, it is equivalent to that the first image light and the second image light are simultaneously incident on different areas, without affecting 3D imaging.

Specifically, in the first time slot of one time period, the first projection assembly 201 projects the first image light to the first coupling-in module 203-1, and the first image light is coupled into the light guide assembly 205 via the first coupling-in module 203-1; in response to a loaded electric field, each coupling-out light-splitting sub-module in the coupling-out light-splitting module 207-1 modulates the first image light emitted by the corresponding sub-pixel, and emits the modulated first image light to the first position area in the human eye. In the second time slot of the one time period, the second projection assembly 202 projects the second image light to the second coupling-in module 204-1, and the second image light is coupled into the light guide assembly 205 via the second coupling-in module 204-1; in response to a loaded electric field, each coupling-out light-splitting sub-module in the coupling-out light-splitting module 207-1 modulates the second image light emitted by the corresponding sub-pixel, and emits the modulated second image light to the second position area in the human eye.

With the above arrangement, the first projection assembly 201 and the second projection assembly 202 can refresh light field image information in a time-division manner; and the first coupling-in module 203-1, the second coupling-in module 204-1, the light guide assembly 205 and the coupling-out light-splitting module 207-1 cooperate to realize the near-eye light field display, which effectively alleviates the discomfort caused by the vergence-accommodation conflict when the human eye views the 3D object. Since the two projection assemblies share one coupling-out light-splitting module in a time-division manner, a resolution of viewed images is improved as compared with the traditional micro-lens array imaging. In addition, compared with the technology of using multi-layer screens to achieve different focal planes, the display device provided in the present application is lighter and thinner, which can be well applied to AR/VR display.

Figure 7:
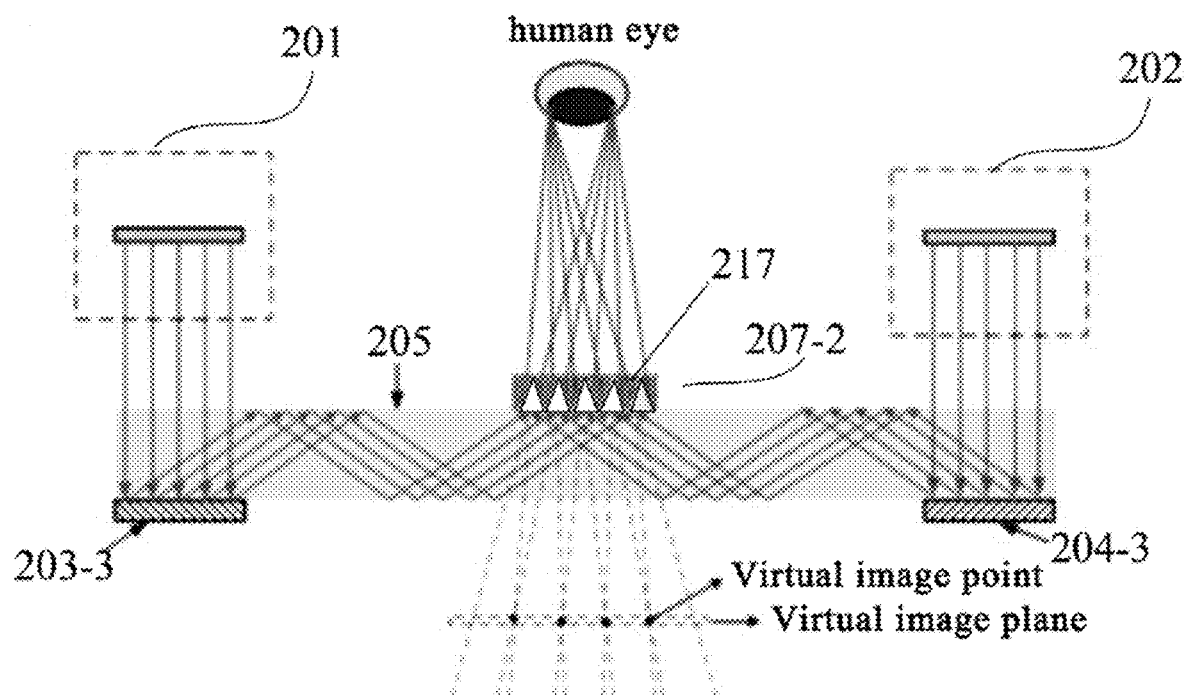
FIG. 7 is a schematic cross-sectional view of a display device according to another embodiment of the present application.

In some optional embodiments, as shown in FIG. 7, the first coupling-in module 203-3 and the second coupling-in module 204-3 are disposed at one side of the light guide assembly 205 away from the first projection assembly 201 and the second projection assembly 202. Each of the first coupling-in module 203-3 and the second coupling-in module 204-3 is a reflective grating element. The specific diffraction modulation principle of the first coupling-in module 203-3 and the second coupling-in module 204-3 is similar to those in FIG. 4 and FIG. 5, and will not be repeated here. By appropriately setting a grating cycle of the reflective grating element used as the coupling-in module, the width of the light beam can be reduced, and then the size of the light spot converged at the human eye can be reduced. That is, the first coupling-in module 203-3 and the second coupling-in module 204-3 are disposed at one side of the light guide assembly 205 away from the human eye, and are respectively located at two side of an orthographic projection of the coupling-out light-splitting module 207-2 onto the light guide assembly 205.

In addition, in this embodiment, the coupling-out light-splitting module 207-2 is disposed at one side of the light guide assembly 205 close to the human eye. An orthographic projection of the coupling-out light-splitting module 207-2 onto the light guide assembly 205 covers an orthographic projection of the human eye onto the light guide assembly 205. The coupling-out light-splitting module 207-2 includes coupling-out light-splitting sub-modules. The coupling-out light-splitting sub-modules are corresponding to various sub-pixels in the first projection assembly 201 and the second projection assembly 203 in a one-to-one manner. The coupling-out light-splitting sub-module is a micro-reflective element. The first projection assembly 201 and the second projection assembly 202 are disposed at one side of the light guide assembly 205 close to the human eye. A light-emitting side of the first projection assembly 201 is oriented towards the first coupling-in module 203-3. A light-emitting side of the second projection assembly 202 is oriented towards the second coupling-in module 204-3. In this embodiment, the micro-reflective element can simultaneously emit the first image light and the second image light to the first position area and the second position area in the human eye, and then there is no need to enable the coupling-out light-splitting module 207-2 to operate in a time-division manner.

Specifically, in this embodiment, the display device is configured as follow: in one time period, the first projection assembly 201 projects the first image light to the first coupling-in module 203-3, and the first image light is coupled into the light guide assembly 205 via the first coupling-in module 203-3; meanwhile, the second projection assembly 202 projects the second image light to the second coupling-in module 204-3, and the second image light is coupled into the light guide assembly 205 via the second coupling-in module 204-3. Each coupling-out light-splitting sub-module in the coupling-out light-splitting module 207-2 modulates the first image light emitted by the corresponding sub-pixel in the first projection assembly 201 and emits the modulated first image light to the first position area in the human eye. Meanwhile, each coupling-out light-splitting sub-module in the coupling-out light-splitting module 207-2 modulates the second image light emitted by the corresponding sub-pixel in the second projection assembly 202 and emits the modulated second image light to the second position area in the human eye. With this arrangement, by using the coupling-out light-splitting sub-module configured as a micro-reflective element in the coupling-out light-splitting module 207-2, different image light rays, which are simultaneously emitted from various sub-pixels in the first projection assembly 201 and the second projection assembly 202, are modulated and emitted into different areas of the human eye, respectively. In this way, a resolution of a displayed screen is improved while simplifying a projection control process, without refreshing a projection screen in a time-division manner.

Figure 8:
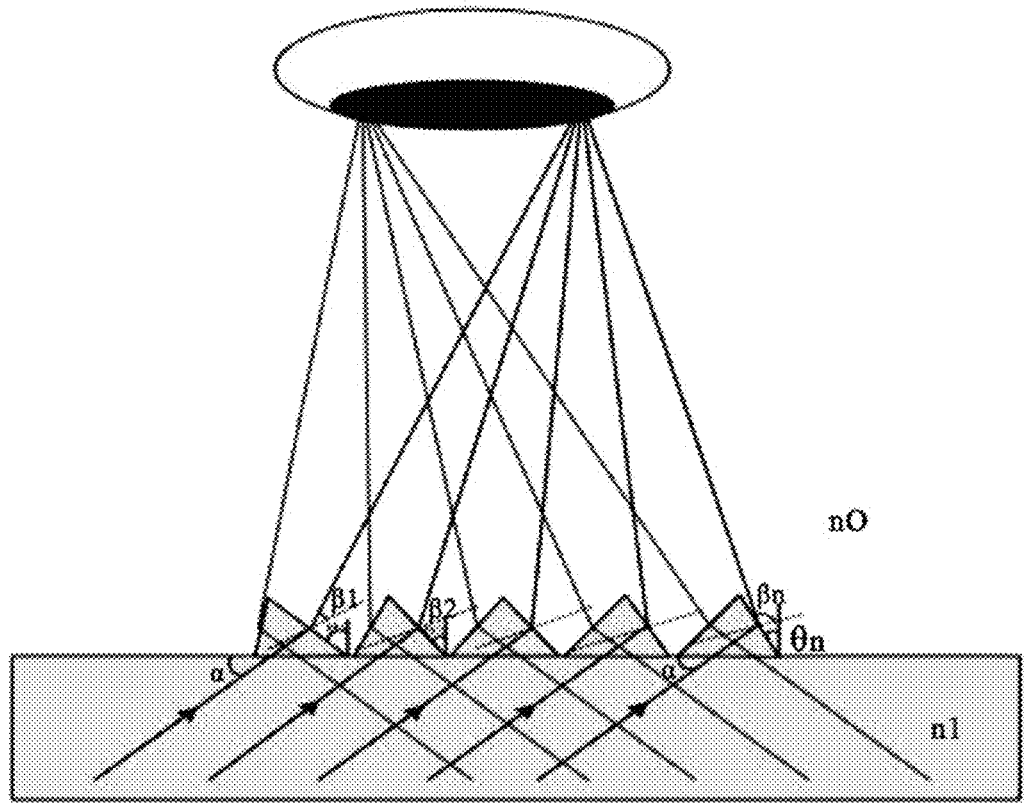
FIG. 8 is a schematic diagram showing coupling-out principle of a coupling-out light-splitting module of the display device shown in FIG. 7.
Figure 9:
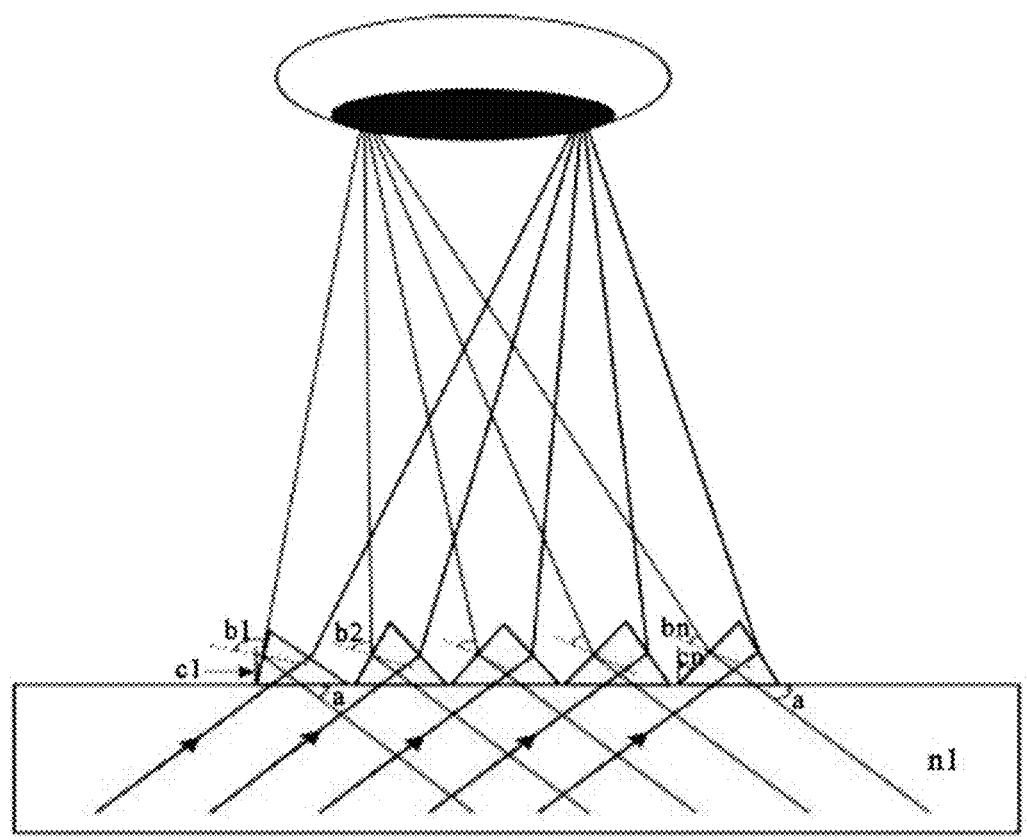
FIG. 9 is a schematic diagram showing coupling-out principle of a coupling-out light-splitting module of the display device shown in FIG. 7.

Specifically, as shown in FIG. 8 and FIG. 9, the coupling-out light-splitting sub-module is a micro-triangular prism. The micro-triangular prism includes a bottom side, a first lateral side, and a lateral second side. A size of the bottom side is corresponding to a size of the sub-pixel. The first image light projected by the sub-pixel corresponding to the first lateral side in the first projection assembly is incident on the first lateral side, and then is emitted from the first lateral side to the first position area in the human eye. The second image light projected by the sub-pixel corresponding to the second lateral side in the second projection assembly is incident on the second lateral side, and then is emitted from the second lateral side to the second position area in the human eye. In FIG. 8 and FIG. 9, straight lines with arrows indicate the first image light incident in the coupling-out light-splitting module 207-2, and straight lines without arrows indicate the second image light incident in the coupling-out light-splitting module 207-2.

Further, as shown in FIG. 8, an angle $\theta$ defined between a normal line perpendicular to the light guide assembly 205 and the first lateral side of each of coupling-out light-splitting sub-modules in the coupling-out light-splitting module 207-2, is decreased sequentially along a first direction, i.e., $\theta_1 > \theta_2 > \theta_3 \ldots \rightarrow \theta_n$. When the first image light enters a coupling-out light-splitting area of the light guide assembly 205 at an incident angle $\alpha$, under the action of the coupling-out light-splitting sub-module, an angle $\beta$ defined between emitted light and a normal line of a light-exiting surface, satisfies: $n_1 * \sin(\alpha - \theta_n) = n_0 * \sin(\beta_n)$, where n is an integer, $n \geq 1$, and $n_1$ represents a refractive index of the coupling-out light-splitting sub-module, and $n_0$ represents a refractive index of air or an external environment of the coupling-out light-splitting sub-module. A refractive index of the light guide assembly 205 is the same as the refractive index of the coupling-out light-splitting sub-module.

Similarly, as shown in FIG. 9, an angle c defined between the normal line perpendicular to the light guide assembly 205 and the second lateral side of each of coupling-out light-splitting sub-modules in the coupling-out light-splitting module 207-2, is increased sequentially along the first direction, i.e., $c_1 > c_2 > c_3 \ldots > c_n$. When the second image light enters the coupling-out light-splitting area of the light guide assembly 205 at an incident angle a, under the action of the coupling-out light-splitting sub-module, an angle b defined between emitted light and a normal line of a light-exiting surface, satisfies: $n_1 * \sin(a - c_n) = n_0 * \sin(b_n)$, where n is an integer, $n \geq 1$, and $n_1$ represents a refractive index of the coupling-out light-splitting sub-module, and $n_0$ represents a refractive index of air or an external environment of the coupling-out light-splitting sub-module. A refractive index of the light guide assembly 205 is the same as the refractive index of the coupling-out light-splitting sub-module.

With the above arrangement, the coupling-out light-splitting sub-module in form of the micro-triangular prism can modulate the image light projected by each sub-pixel in the first projection assembly 201 and the second projection assembly 202 to corresponding viewpoint positions to enter the human eye for imaging, thereby improving a resolution of a displayed screen with no need to enable the coupling-out light-splitting module 207-2 to operate in a time-division manner.

In some optional embodiments, as shown in FIG. 7, the coupling-out light-splitting module 207-2 further includes a first deflection auxiliary portion 217 covering the coupling-out light-splitting sub-module. A refractive index of the first deflection auxiliary portion 217 is $n_2$. In case that a refractive index of the coupling-out light-splitting sub-module is $n_1$, then $n_2 < n_1$. The first deflection auxiliary portion 217 is used to perform auxiliary adjustment of deflection ability of light. Specifically, after the first image light and the second image light are emitted at preset deflection angles from the coupling-out light-splitting sub-module in coupling-out light-splitting module 207-2, the emitted light is further adjusted by the first deflection auxiliary portion 217, to adjust deflection angles of the emitted light, so that the emitted light can be accurately emitted into corresponding viewpoint areas in the human eye, thereby improving accuracy of the deflection angle, and ensuring a clear image spot presented in the human eye. Optionally, the first deflection auxiliary portion 217 is a liquid crystal layer with a variable refractive index. The refractive index of the liquid crystal layer can be adjusted based on a voltage applied to liquid crystal molecules, but it is not limited to this. According to actual application requirements, those skilled in the art should select an appropriate first deflection auxiliary portion, with a design criterion that the refractive index of the first deflection auxiliary portion is greater than the refractive index of the coupling-out light-splitting sub-module, which will not be repeated here.

In this embodiment, without refreshing the projected image in a time-division manner, in the same time period, the first projection assembly 201 and the second projection assembly 202 project the first image light and the second image light with different light field information of the same image, and the coupling-out light-splitting module 207-2 uses its coupling-out light-splitting sub-module and first deflection auxiliary portion 217 to respectively emit the first image light and the second image light to the first position area and the second position area of the human eye, thereby improving the resolution of the displayed image.

In some optional embodiments, the display device shown in FIG. 7 may further be combined with a time-division multiplexing device to realize higher resolution image display. In this case, the coupling-out light-splitting sub-module includes a light-splitting portion and a second deflection auxiliary portion 217 covering the light-splitting portion. The light-splitting portion is a micro-reflective element. The second deflection auxiliary portion is a liquid crystal layer. In response to a voltage applied to the liquid crystal layer, liquid crystal modules in the liquid crystal layer are deflected to enable the liquid crystal layer to have a variable second refractive index. The second refractive index is less than a refractive index of the light-splitting portion. Those skilled in the art should understand that, in order to distinguish from the previous embodiment, the deflection auxiliary portion configured as the liquid crystal layer combined with the time-division multiplexing device is referred to as the second deflection auxiliary portion, which is also denoted with 217 as there is no obvious difference between the first deflection auxiliary portion and the second deflection auxiliary portion in the schematic diagram.

Specifically, in this embodiment, with the adjustable refractive index of the liquid crystal layer, in multiple time slots within the human visual residual time range, the first projection assembly 201 and the second projection assembly 202 project multiple sets of image light. In each time slot, by varying the second refractive index of the liquid crystal layer, multiple sets of image light can be emitted into different position areas in the human eye, so that the human eye can recognize multiple viewpoints, thereby further improving the resolution.

More specifically, on the basis of the foregoing embodiment, four viewpoints may be presented in the human eye by dividing one time period into two time slots.

In the first time slot of one time period, the first projection assembly 201 projects the first image light to the first coupling-in module 203-1, and the first image light is coupled into the light guide assembly 205 via the first coupling-in module 203-1; meanwhile, the second projection assembly 202 projects the second image light to the second coupling-in module 204-3, and the second image light is coupled into the light guide assembly 205 via the second coupling-in module 204-3. The light-splitting portion of each coupling-out light-splitting sub-module in the coupling-out light-splitting module 207-2 modulates the first image light emitted by the corresponding sub-pixel in the first projection assembly 201. Then, after a deflection angle of the modulated first image light is adjusted by the second deflection auxiliary portion 217, the modulated first image light is emitted to the first position area in the human eye. Meanwhile, the light-splitting portion of each coupling-out light-splitting sub-module in the coupling-out light-splitting module 207-2 modulates the second image light emitted by the corresponding sub-pixel in the second projection assembly 202. Then, after a deflection angle of the modulated second image light is adjusted by the second deflection auxiliary portion 217, the modulated second image light is emitted to the second position area in the human eye.

In the second time slot of one time period, the first projection assembly 201 projects the first image light to the first coupling-in module 203, and the first image light is coupled into the light guide assembly 205 via the first coupling-in module 203; meanwhile, the second projection assembly 202 projects the second image light to the second coupling-in module 204, and the second image light is coupled into the light guide assembly 205 via the second coupling-in module 204. The light-splitting portion of each coupling-out light-splitting sub-module in the coupling-out light-splitting module 207-2 modulates the first image light emitted by the corresponding sub-pixel in the first projection assembly 201. Then, after a deflection angle of the modulated first image light is adjusted by the second deflection auxiliary portion, the modulated first image light is emitted to a third position area in the human eye. Meanwhile, the light-splitting portion of each coupling-out light-splitting sub-module in the coupling-out light-splitting module 207-2 modulates the second image light emitted by the corresponding sub-pixel in the second projection assembly 202. Then, after a deflection angle of the modulated second image light is adjusted by the second deflection auxiliary portion 217, the modulated second image light is emitted to a fourth position area in the human eye.

An interval between the first time slot and the second time slot is less than the human visual residual time. The first image light and the second image light in the first time slot, and the first image light and the second image light in the second time slot are different light field information of the same image.

With foregoing arrangement, the liquid crystal layer provided on the light-splitting portion can exhibit different refractive index based on the voltage applied to the liquid crystal layer, and thus, by setting the voltage applied to the liquid crystal layer in the first time slot and the second time slot, the liquid crystal layer exhibits different refractive index, so that image light emitted from the coupling-out light-splitting module 207-2 in different time slots can be deflected at different deflection angles, thereby increasing the number of viewpoints in the eyes and further improving the resolution of image display.

It should be noted that although FIG. 6 shows that the first coupling-in module and the second coupling-in module are planar reflective elements and the coupling-out light-splitting module is a diffraction grating element, and FIG. 7 shows that the first coupling-in module and the second coupling-in module are diffraction grating elements disposed on a different side of the light guide assembly from the first projection assembly and the second projection assembly and the coupling-out light-splitting sub-module in the coupling-out light-splitting module is a micro-reflective element, those skilled in the art should understand that the settings of the coupling-in module and the coupling-out light-splitting module are relatively independent, and the coupling-in modules shown in FIG. 3, FIG. 6 and FIG. 7 may also cooperate with the coupling-out light-splitting modules in these figures to form other display devices. That is, the display device may further include a combination of the first coupling-in module 203-1, the second coupling-in module 204-1 and the coupling-out light-splitting module 207-2, a combination of the first coupling-in module 203-2, the second coupling-in module 204-2 and the coupling-out light-splitting module 207-2, or a combination of the first coupling-in module 203-3, the second coupling-in module 204-3 and the coupling-out light-splitting module 207-1, and specific structures and principles are similar to those in the foregoing embodiments and will not be repeated here.

Corresponding to the display device, one embodiment of the present application further provides a display method for using the display device. The display method includes:

using the first coupling-in module to couple first image light projected by the first projection assembly into the light guide assembly at a preset first incident angle, thereby enabling the first image light to propagate in the light guide assembly by total reflection according to a preset first total reflection angle and then enabling the first image light to be incident in the coupling-out light-splitting module;

using the second coupling-in module to couple second image light projected by the second projection assembly into the light guide assembly at a preset second incident angle, thereby enabling the second image light to propagate in the light guide assembly by total reflection according to a preset second total reflection angle and then enabling the second image light to be incident in the coupling-out light-splitting module;

using the coupling-out light-splitting module to couple the first image light propagated in the light guide assembly by total reflection out from the light guide assembly at a first deflection angle to enter a first position area of the human eye;

using the coupling-out light-splitting module to couple the second image light propagated in the light guide assembly by total reflection out from the light guide assembly at a second deflection angle to enter a second position area of the human eye.

The first image light and the second image light are different light field information of an identical image. The first image light and the second image light are both collimated light.

In this embodiment, the first image light projected by the first projection assembly and the second image light projected by the second projection assembly are coupled into the light guide assembly at preset angles through the first coupling-in module and the second coupling-in module, respectively. Then, the first image light and the second image light are transmitted in a total reflection manner in the light guide assembly. And then, the coupling-out light-splitting module couples the first image light and the second image light out from the light guide assembly to enter the first position area and the second position area of the human eye, respectively. In this way, vergence-accommodation conflict can be avoided in the near-eye light field display; meanwhile, a resolution of the near-eye light field display can be improved while reducing sizes of the display device, which has a wide range of application prospects.

In some optional embodiments, the coupling-out light-splitting module is disposed at one side of the light guide assembly close to the human eye. An orthographic projection of the coupling-out light-splitting module onto the light guide assembly covers an orthographic projection of the human eye onto the light guide assembly. The coupling-out light-splitting module includes coupling-out light-splitting sub-modules. The coupling-out light-splitting sub-modules are corresponding to various sub-pixels in the first projection assembly and the second projection assembly in a one-to-one manner. The coupling-out light-splitting sub-module is a diffraction grating element. The first coupling-in module and the second coupling-in module are disposed at two sides of the light guide assembly with respect to the coupling-out light-splitting module. The first projection assembly and the second projection assembly are disposed at one side of the light guide assembly close to the human eye, respectively. A light-emitting side of the first projection assembly is oriented towards the first coupling-in module. A light-emitting side of the second projection assembly is oriented towards the second coupling-in module. The display method includes:

in a first time slot of one time period, projecting, by the first projection assembly, the first image light to the first coupling-in module; coupling, by the first coupling-in module, the first image light into the light guide assembly; in response to a loaded electric field, modulating, by each coupling-out light-splitting sub-module in the coupling-out light-splitting module, the first image light emitted by the corresponding sub-pixel, and emitting the modulated first image light to a first position area in the human eye;

in a second time slot of the one time period, projecting, by the second projection assembly, the second image light to the second coupling-in module; coupling, by the second coupling-in module, the second image light into the light guide assembly; in response to a loaded electric field, modulating, by each coupling-out light-splitting sub-module in the coupling-out light-splitting module, the second image light emitted by the corresponding sub-pixel, and emitting the modulated second image light to a second position area in the human eye;

where an interval between the first time slot and the second time slot is less than human visual residual time.

With the above arrangement, the first projection assembly and the second projection assembly can refresh light field image information in a time-division manner; and the first coupling-in module, the second coupling-in module, the light guide assembly and the coupling-out light-splitting module cooperate to realize the near-eye light field display, which effectively alleviates the discomfort caused by the vergence-accommodation conflict when the human eye views the 3D object. Since the two projection assemblies share one coupling-out light-splitting module in a time-division manner, a resolution of viewed images is improved as compared with the traditional micro-lens array imaging. In addition, compared with the technology of using multi-layer screens to achieve different focal planes, the display device provided in the present application is lighter and thinner, which can be well applied to AR/VR display.

In some optional embodiments, the coupling-out light-splitting module is disposed at one side of the light guide assembly close to the human eye. An orthographic projection of the coupling-out light-splitting module onto the light guide assembly covers an orthographic projection of the human eye onto the light guide assembly. The coupling-out light-splitting module includes coupling-out light-splitting sub-modules. The coupling-out light-splitting sub-modules are corresponding to various sub-pixels in the first projection assembly and the second projection assembly in a one-to-one manner. The coupling-out light-splitting sub-module is a micro-reflective element. Each of the first coupling-in module and the second coupling-in module is a reflective grating element. The first coupling-in module and the second coupling-in module are disposed at one side of the light guide assembly away from the human eye. The first coupling-in module and the second coupling-in module are respectively disposed at two sides of the light guide assembly relative to the coupling-out light-splitting module. The first projection assembly and the second projection assembly are disposed at one side of the light guide assembly close to the human eye. A light-emitting side of the first projection assembly is oriented towards the first coupling-in module. A light-emitting side of the second projection assembly is oriented towards the second coupling-in module.

In one time period, the first projection assembly projects the first image light to the first coupling-in module, and the first image light is coupled into the light guide assembly via the first coupling-in module; meanwhile, the second projection assembly projects the second image light to the second coupling-in module, and the second image light is coupled into the light guide assembly via the second coupling-in module. Each coupling-out light-splitting sub-module in the coupling-out light-splitting module modulates the first image light emitted by the corresponding sub-pixel in the first projection assembly and emits the modulated first image light to the first position area in the human eye. Meanwhile, each coupling-out light-splitting sub-module in the coupling-out light-splitting module modulates the second image light emitted by the corresponding sub-pixel in the second projection assembly and emits the modulated second image light to the second position area in the human eye.

In this embodiment, the coupling-out light-splitting sub-module in form of the micro-reflective element can modulate the image light projected by each sub-pixel in the first projection assembly and the second projection assembly to corresponding viewpoint positions to enter the human eye for imaging, thereby improving a resolution of a displayed screen with no need to enable the coupling-out light-splitting module to operate in a time-division manner.

In some optional embodiments, the coupling-out light-splitting module is disposed at one side of the light guide assembly close to the human eye. An orthographic projection of the coupling-out light-splitting module onto the light guide assembly covers an orthographic projection of the human eye onto the light guide assembly. The coupling-out light-splitting module includes coupling-out light-splitting sub-modules. The coupling-out light-splitting sub-modules are corresponding to various sub-pixels in the first projection assembly and the second projection assembly in a one-to-one manner. The coupling-out light-splitting sub-module includes a light-splitting portion and a second deflection auxiliary portion covering the light-splitting portion. The light-splitting portion is a micro-reflective element. The second deflection auxiliary portion is a liquid crystal layer. In response to a voltage applied to the liquid crystal layer, liquid crystal modules in the liquid crystal layer are deflected to enable the liquid crystal layer to have a variable second refractive index. The second refractive index is less than a refractive index of the light-splitting portion. Each of the first coupling-in module and the second coupling-in module is a reflective grating element. The first coupling-in module and the second coupling-in module are disposed at one side of the light guide assembly away from the human eye. The first coupling-in module and the second coupling-in module are respectively disposed at two sides of the light guide assembly relative to the coupling-out light-splitting module. The first projection assembly and the second projection assembly are disposed at one side of the light guide assembly close to the human eye. A light-emitting side of the first projection assembly is oriented towards the first coupling-in module. A light-emitting side of the second projection assembly is oriented towards the second coupling-in module. The method includes:

in a first time slot of one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a first position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a second position area in the human eye;

in a second time slot of the one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a third position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a fourth position area in the human eye;

where an interval between the first time slot and the second time slot is less than the human visual residual time; the first image light and the second image light in the first time slot, and the first image light and the second image light in the second time slot are different light field information of the same image.

With foregoing arrangement, the liquid crystal layer can exhibit different refractive index based on the voltage applied to the liquid crystal layer, and thus, by setting the liquid crystal layer to exhibit different refractive index in the first time slot and the second time slot, and cooperating with the light-splitting portion, the image light emitted from the coupling-out light-splitting module in different time slots can be deflected at different deflection angles, thereby increasing the number of viewpoints in the eyes and further improving the resolution of image display.

Based on the same inventive concept, one embodiment of the present application further provides an augmented reality apparatus, including the display device described in the foregoing embodiments. The problem-solving principle of the augmented reality apparatus is similar to that of the foregoing display device. Therefore, the specific implementation of the augmented reality apparatus can refer to implementation of the light field display device in the foregoing embodiment, which will not be repeated here.

In view of the current existing problems, the present application provides a display device, an augmented reality apparatus and a display method, in which the first image light projected by the first projection assembly and the second image light projected by the second projection assembly are coupled into the light guide assembly at preset angles through the first coupling-in module and the second coupling-in module, respectively, then the first image light and the second image light are transmitted in a total reflection manner in the light guide assembly, and then, the coupling-out light-splitting module couples the first image light and the second image light out from the light guide assembly to enter the first position area and the second position area of the human eye, respectively. In this way, vergence-accommodation conflict can be avoided in the near-eye light field display; meanwhile, a resolution of the near-eye light field display can be improved while reducing sizes of the display device, which has a wide range of application prospects.

The above descriptions are merely some embodiments of the present disclosure. It should be noted that for those of ordinary skill in the art, without departing from the principles of the present disclosure, various improvements and modifications can be made. These improvements and modifications should fall within the protection scope of the present disclosure.

What is claimed is:

1. A display device, comprising:
    a first projection assembly;
    a first coupling-in module corresponding to the first projection assembly;
    a second projection assembly;
    a second coupling-in module corresponding to the second projection assembly;
    a light guide assembly; and
    a coupling-out light-splitting module;
    wherein the first coupling-in module is configured to couple first image light projected by the first projection assembly into the light guide assembly at a preset first incident angle, thereby enabling the first image light to propagate in the light guide assembly by total reflection according to a preset first total reflection angle and enabling the first image light to be incident in the coupling-out light-splitting module;
    the second coupling-in module is configured to couple second image light projected by the second projection assembly into the light guide assembly at a preset second incident angle, thereby enabling the second image light to propagate in the light guide assembly by total reflection according to a preset second total reflection angle and enabling the second image light to be incident in the coupling-out light-splitting module;
    the coupling-out light-splitting module is configured to, couple the first image light propagated in the light guide assembly by total reflection out from the light guide assembly at a first deflection angle to enter a first position area of the human eye and couple the second image light propagated in the light guide assembly by total reflection out from the light guide assembly at a second deflection angle to enter a second position area of the human eye; and
    the first image light and the second image light are different light field information of an identical image; and the first image light and the second image light are both collimated light;
    wherein the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a diffraction grating element;
    the first coupling-in module and the second coupling-in module are disposed at two sides of the light guide assembly relative to the coupling-out light-splitting module, respectively;
    the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module;
    the display device is configured as:
    in a first time slot of one time period, projecting, by the first projection assembly, the first image light to the first coupling-in module; coupling, by the first coupling-in module, the first image light into the light guide assembly; in response to a loaded electric field, modulating, by each coupling-out light-splitting sub-module in the coupling-out light-splitting module, the first image light emitted by the corresponding sub-pixel, and emitting the modulated first image light to a first position area in the human eye;
    in a second time slot of the one time period, projecting, by the second projection assembly, the second image light to the second coupling-in module; coupling, by the second coupling-in module, the second image light into the light guide assembly; in response to a loaded electric field, modulating, by each coupling-out light-splitting sub-module in the coupling-out light-splitting module, the second image light emitted by the corresponding sub-pixel, and emitting the modulated second image light to a second position area in the human eye;
    wherein an interval between the first time slot and the second time slot is less than human visual residual time.

2. The display device according to claim 1, wherein each of the first coupling-in module and the second coupling-in module is a diffraction grating element which is arranged at one side of the light guide assembly close to the human eye.

3. The display device according to claim 2, wherein the diffraction grating element is one of a surface relief grating, a holographic Bragg grating, and a controllable nano-grating.

4. The display device according to claim 1, wherein each of the first coupling-in module and the second coupling-in module is a planar reflective element, and the planar reflective elements are disposed at two sides of the light guide assembly at a preset inclination angle.

5. The display device according to claim 4, wherein the planar reflective element is a wedge-shaped reflective surface coated with a film.

6. The display device according to claim 1, wherein the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a micro-reflective element;

the first coupling-in module and the second coupling-in module are reflective grating elements disposed at one side of the light guide assembly away from the human eye; and the first coupling-in module and the second coupling-in module are respectively disposed at two sides of the light guide assembly relative to the coupling-out light-splitting module;

the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module;

the display device is configured as, in one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by each coupling-out light-splitting sub-module in the coupling-out light-splitting module, the first image light emitted by the corresponding sub-pixel in the first projection assembly, and emitting the modulated first image light to a first position area in the human eye; and modulating, by each coupling-out light-splitting sub-module in the coupling-out light-splitting module, the second image light emitted by the corresponding sub-pixel in the second projection assembly, and emitting the modulated second image light to a second position area in the human eye.

7. The display device according to claim 6, wherein the coupling-out light-splitting sub-module is a micro-triangular prism; the micro-triangular prism includes a bottom side, a first lateral side, and a lateral second side; a size of the bottom side is corresponding to a size of the sub-pixel; the first lateral side is configured to, emit the first image light, which is projected by the sub-pixel corresponding to the first lateral side in the first projection assembly and which is incident on the first lateral side, to the first position area in the human eye; the second lateral side is configured to, emit the second image light, which is projected by the sub-pixel corresponding to the second lateral side in the second projection assembly and which is incident on the second lateral side, to the second position area in the human eye;

an angle defined between a normal line perpendicular to the light guide assembly and the first lateral side of each of coupling-out light-splitting sub-modules in the coupling-out light-splitting module, is decreased sequentially along a first direction; and an angle defined between the normal line perpendicular to the light guide assembly and the second lateral side of each of coupling-out light-splitting sub-modules in the coupling-out light-splitting module, is increased sequentially along the first direction.

8. The display device according to claim 6, wherein the coupling-out light-splitting module further includes a first deflection auxiliary portion covering each of the coupling-out light-splitting sub-modules; and a first refractive index of the first deflection auxiliary portion is less than a refractive index of the coupling-out light-splitting sub-module.

9. The display device according to claim 1, wherein the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module includes a light-splitting portion and a second deflection auxiliary portion covering the light-splitting portion; the light-splitting portion is a micro-reflective element; the second deflection auxiliary portion is a liquid crystal layer; in response to a voltage applied to the liquid crystal layer, liquid crystal modules in the liquid crystal layer are deflected to enable the liquid crystal layer to have a variable second refractive index; the second refractive index is less than a refractive index of the light-splitting portion;

each of the first coupling-in module and the second coupling-in module is a reflective grating element; the first coupling-in module and the second coupling-in module are disposed at one side of the light guide assembly away from the human eye; the first coupling-in module and the second coupling-in module are respectively disposed at two sides of the light guide assembly relative to the coupling-out light-splitting module;

the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module;

the display device is configured as:

in a first time slot of one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a first position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a second position area in the human eye;

in a second time slot of the one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a third position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a fourth position area in the human eye;

wherein an interval between the first time slot and the second time slot is less than the human visual residual time; the first image light and the second image light in the first time slot, and the first image light and the second image light in the second time slot are different light field information of the same image.

10. The display device according to claim 1, wherein each of the first projection assembly and the second projection assembly includes a collimated backlight source and a display panel; the collimated backlight source is configured to emit collimated backlight to the display panel; the collimated backlight source is a laser light source; the display panel is configured to control a color and gray scale of light emitted from each pixel, and emit collimated image light according to the incident collimated backlight; the display panel is an LCD, LCOS or Micro-OLED;

and/or, the light guide assembly is a transparent glass substrate.

11. A display method for the display device according to claim 1, comprising:

using the first coupling-in module to couple first image light projected by the first projection assembly into the light guide assembly at a preset first incident angle, thereby enabling the first image light to propagate in the light guide assembly by total reflection according to a preset first total reflection angle and then enabling the first image light to be incident in the coupling-out light-splitting module;

using the second coupling-in module to couple second image light projected by the second projection assembly into the light guide assembly at a preset second incident angle, thereby enabling the second image light to propagate in the light guide assembly by total reflection according to a preset second total reflection angle and then enabling the second image light to be incident in the coupling-out light-splitting module;

using the coupling-out light-splitting module to couple the first image light propagated in the light guide assembly by total reflection out from the light guide assembly at a first deflection angle to enter a first position area of the human eye;

using the coupling-out light-splitting module to couple the second image light propagated in the light guide assembly by total reflection out from the light guide assembly at a second deflection angle to enter a second position area of the human eye;

wherein the first image light and the second image light are different light field information of an identical image; and the first image light and the second image light are both collimated light;

wherein the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a diffraction grating element; the first coupling-in module and the second coupling-in module are disposed at two sides of the light guide assembly relative to the coupling-out light-splitting module, respectively; the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module;

the display method further includes:

in a first time slot of one time period, projecting, by the first projection assembly, the first image light to the first coupling-in module; coupling, by the first coupling-in module, the first image light into the light guide assembly; in response to a loaded electric field, modulating, by each coupling-out light-splitting sub-module in the coupling-out light-splitting module, the first image light emitted by the corresponding sub-pixel, and emitting the modulated first image light to a first position area in the human eye;

in a second time slot of the one time period, projecting, by the second projection assembly, the second image light to the second coupling-in module; coupling, by the second coupling-in module, the second image light into the light guide assembly; in response to a loaded electric field, modulating, by each coupling-out light-splitting sub-module in the coupling-out light-splitting module, the second image light emitted by the corresponding sub-pixel, and emitting the modulated second image light to a second position area in the human eye;

wherein an interval between the first time slot and the second time slot is less than human visual residual time.

12. The display method according to claim 11, wherein the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a micro-reflective element; the first coupling-in module and the second coupling-in module are reflective grating elements disposed at one side of the light guide assembly away from the human eye; and the first coupling-in module and the second coupling-in module are respectively disposed at two sides of the light guide assembly relative to the coupling-out light-splitting module; the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module;

the display method includes:

in one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by each coupling-out light-splitting sub-module in the coupling-out light-splitting module, the first image light emitted by the corresponding sub-pixel in the first projection assembly, and emitting the modulated first image light to a first position area in the human eye; and modulating, by each coupling-out light-splitting sub-module in the coupling-out light-splitting module, the second image light emitted by the corresponding sub-pixel in the second projection assembly, and emitting the modulated second image light to a second position area in the human eye.

13. The display method according to claim 11, wherein the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module includes a light-splitting portion and a second deflection auxiliary portion covering the light-splitting portion; the light-splitting portion is a micro-reflective element; the second deflection auxiliary portion is a liquid crystal layer; in response to a voltage applied to the liquid crystal layer, liquid crystal modules in the liquid crystal layer are deflected to enable the liquid crystal layer to have a variable second refractive index; the second refractive index is less than a refractive index of the light-splitting portion; each of the first coupling-in module and the second coupling-in module is a reflective grating element; the first coupling-in module and the second coupling-in module are disposed at one side of the light guide assembly away from the human eye; the first coupling-in module and the second coupling-in module are respectively disposed at two sides of the light guide assembly relative to the coupling-out light-splitting module; the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module;

the display method includes:

in a first time slot of one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a first position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a second position area in the human eye;

in a second time slot of the one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a third position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a fourth position area in the human eye;

wherein an interval between the first time slot and the second time slot is less than the human visual residual time; the first image light and the second image light in the first time slot, and the first image light and the second image light in the second time slot are different light field information of the same image.

14. An augmented reality apparatus, comprising:

a display device including:

a first projection assembly;

a first coupling-in module corresponding to the first projection assembly;

a second projection assembly;

a second coupling-in module corresponding to the second projection assembly;

a light guide assembly; and a coupling-out light-splitting module;

wherein the first coupling-in module is configured to couple first image light projected by the first projection assembly into the light guide assembly at a preset first incident angle, thereby enabling the first image light to propagate in the light guide assembly by total reflection according to a preset first total reflection angle and enabling the first image light to be incident in the coupling-out light-splitting module;

the second coupling-in module is configured to couple second image light projected by the second projection assembly into the light guide assembly at a preset second incident angle, thereby enabling the second image light to propagate in the light guide assembly by total reflection according to a preset second total reflection angle and enabling the second image light to be incident in the coupling-out light-splitting module;

the coupling-out light-splitting module is configured to, couple the first image light propagated in the light guide assembly by total reflection out from the light guide assembly at a first deflection angle to enter a first position area of the human eye and couple the second image light propagated in the light guide assembly by total reflection out from the light guide assembly at a second deflection angle to enter a second position area of the human eye; and the first image light and the second image light are different light field information of an identical image; and the first image light and the second image light are both collimated light;

wherein the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a diffraction grating element;

the first coupling-in module and the second coupling-in module are disposed at two sides of the light guide assembly relative to the coupling-out light-splitting module, respectively;

the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module;

the display device is configured as:

in a first time slot of one time period, projecting, by the first projection assembly, the first image light to the first coupling-in module; coupling, by the first coupling-in module, the first image light into the light guide assembly; in response to a loaded electric field, modulating, by each coupling-out light-splitting sub-module in the coupling-out light-splitting module, the first image light emitted by the corresponding sub-pixel, and emitting the modulated first image light to a first position area in the human eye;

in a second time slot of the one time period, projecting, by the second projection assembly, the second image light to the second coupling-in module; coupling, by the second coupling-in module, the second image light into the light guide assembly; in response to a loaded electric field, modulating, by each coupling-out light-splitting sub-module in the coupling-out light-splitting module, the second image light emitted by the corresponding sub-pixel, and emitting the modulated second image light to a second position area in the human eye;

wherein an interval between the first time slot and the second time slot is less than human visual residual time.

15. The augmented reality apparatus according to claim 14, wherein the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module is a micro-reflective element;

the first coupling-in module and the second coupling-in module are reflective grating elements disposed at one side of the light guide assembly away from the human eye; and the first coupling-in module and the second coupling-in module are respectively disposed at two sides of the light guide assembly relative to the coupling-out light-splitting module;

the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module;

the display device is configured as, in one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by each coupling-out light-splitting sub-module in the coupling-out light-splitting module, the first image light emitted by the corresponding sub-pixel in the first projection assembly, and emitting the modulated first image light to a first position area in the human eye; and modulating, by each coupling-out light-splitting sub-module in the coupling-out light-splitting module, the second image light emitted by the corresponding sub-pixel in the second projection assembly, and emitting the modulated second image light to a second position area in the human eye.

16. The augmented reality apparatus according to claim 15, wherein the coupling-out light-splitting module further includes a first deflection auxiliary portion covering each of the coupling-out light-splitting sub-modules; and a first refractive index of the first deflection auxiliary portion is less than a refractive index of the coupling-out light-splitting sub-module.

17. The augmented reality apparatus according to claim 14, wherein the coupling-out light-splitting module is disposed at one side of the light guide assembly close to the human eye; an orthographic projection of the coupling-out light-splitting module onto the light guide assembly covers an orthographic projection of the human eye onto the light guide assembly; the coupling-out light-splitting module includes coupling-out light-splitting sub-modules which are corresponding to various sub-pixels in the first projection assembly and the second projection assembly in a one-to-one manner; the coupling-out light-splitting sub-module includes a light-splitting portion and a second deflection auxiliary portion covering the light-splitting portion; the light-splitting portion is a micro-reflective element; the second deflection auxiliary portion is a liquid crystal layer; in response to a voltage applied to the liquid crystal layer, liquid crystal modules in the liquid crystal layer are deflected to enable the liquid crystal layer to have a variable second refractive index; the second refractive index is less than a refractive index of the light-splitting portion;

each of the first coupling-in module and the second coupling-in module is a reflective grating element; the first coupling-in module and the second coupling-in module are disposed at one side of the light guide assembly away from the human eye; the first coupling-in module and the second coupling-in module are respectively disposed at two sides of the light guide assembly relative to the coupling-out light-splitting module;

the first projection assembly and the second projection assembly are disposed at one side of the light guide assembly close to the human eye; a light-emitting side of the first projection assembly is oriented towards the first coupling-in module; a light-emitting side of the second projection assembly is oriented towards the second coupling-in module;

the display device is configured as:

in a first time slot of one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a first position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a second position area in the human eye;

in a second time slot of the one time period, projecting, by the first projection assembly, the first image light to the first coupling-in module; coupling, by the first coupling-in module, the first image light into the light guide assembly; projecting, by the second projection assembly, the second image light to the second coupling-in module; coupling, by the second coupling-in module, the second image light into the light guide assembly; modulating, by the light-splitting portion of each coupling-out light-splitting sub-module in the coupling-out light-splitting module, the first image light emitted by the corresponding sub-pixel in the first projection assembly; adjusting, by the second deflection auxiliary portion, a deflection angle of the modulated first image light; and emitting the modulated first image light with an adjusted deflection angle to a third position area in the human eye; modulating, by the light-splitting portion of each coupling-out light-splitting sub-module in the coupling-out light-splitting module, the second image light emitted by the corresponding sub-pixel in the second projection assembly; adjusting, by the second deflection auxiliary portion, a deflection angle of the modulated second image light; and emitting the modulated second image light with an adjusted deflection angle to a fourth position area in the human eye;

wherein an interval between the first time slot and the second time slot is less than the human visual residual time; the first image light and the second image light in the first time slot, and the first image light and the second image light in the second time slot are different light field information of the same image.

\* \* \* \* \*